United States Patent
Jang et al.

(10) Patent No.: US 8,480,282 B2
(45) Date of Patent: Jul. 9, 2013

(54) REFLECTIVE PLATE AND METHOD FOR MANUFACTURING THE SAME AND BACKLIGHT UNIT FOR LIQUID CRYSTAL DISPLAY DEVICE USING THE SAME

(75) Inventors: Myong Gi Jang, Gyeonggi-do (KR); Gi Bin Kim, Gyeonggi-do (KR); Tae Woo Kim, Gyeonggi-do (KR)

(73) Assignee: LG Display Co., Ltd., Seoul (KR)

(*) Notice: Subject to any disclaimer, the term of this patent is extended or adjusted under 35 U.S.C. 154(b) by 808 days.

(21) Appl. No.: 11/512,137

(22) Filed: Aug. 30, 2006

(65) Prior Publication Data

US 2007/0053205 A1 Mar. 8, 2007

(30) Foreign Application Priority Data

Aug. 30, 2005 (KR) .................. 10-2005-0080231
Jan. 11, 2006 (KR) .................. 10-2006-0003190
Feb. 1, 2006 (KR) .................. 10-2006-0009638

(51) Int. Cl.
*F21V 7/04* (2006.01)
*G02F 1/1335* (2006.01)
*G02F 1/1333* (2006.01)

(52) U.S. Cl.
USPC .............. 362/609; 349/67; 349/113; 349/122

(58) Field of Classification Search
USPC ................ 349/67, 62, 65, 113, 122; 362/609
See application file for complete search history.

(56) References Cited

U.S. PATENT DOCUMENTS

| 5,101,260 | A | * | 3/1992 | Nath et al. ........................ 257/53 |
| 5,742,366 | A | * | 4/1998 | Imoto .............................. 349/62 |
| 6,324,011 | B1 | * | 11/2001 | Higuchi ......................... 359/627 |
| 6,685,330 | B2 | | 2/2004 | Miyazaki |
| 7,242,441 | B2 | * | 7/2007 | Kimura et al. .................. 349/45 |
| 7,445,348 | B2 | * | 11/2008 | Shimada et al. .............. 359/883 |

FOREIGN PATENT DOCUMENTS

| CN | 2641676 Y | | 9/2004 |
| JP | 2004-101693 A | | 4/2004 |
| JP | 2004101693 A | * | 4/2004 |

* cited by examiner

*Primary Examiner* — Lucy Chien
*Assistant Examiner* — Paisley L Arendt
(74) *Attorney, Agent, or Firm* — Morgan, Lewis & Bockius LLP (57) ABSTRACT

A reflective plate includes a high heat conductivity material having a first heat conductivity and a reflective material having a second heat conductivity on the high heat conductivity material, wherein the first heat conductivity of the high heat conductivity material is greater than the second heat conductivity of the reflective material.

3 Claims, 6 Drawing Sheets

REFLECTIVE PLATE AND METHOD FOR MANUFACTURING THE SAME AND BACKLIGHT UNIT FOR LIQUID CRYSTAL DISPLAY DEVICE USING THE SAME

This application claims the benefit of the Patent Korean Application No. P2006-003190 filed on Jan. 11, 2006, P2005-080231 filed on Aug. 30, 2005, and P2006-009638 filed on Feb. 1, 2006, which are hereby incorporated by reference in their entirety.

BACKGROUND OF THE INVENTION

1. Field of the Invention

Embodiments of the invention relate to reflecting light, and more particularly, to a reflective plate and method for manufacturing the same and a backlight unit for a liquid crystal display (LCD) device using the same. Although the embodiments of the invention are suitable for a wide scope of applications, it is particularly suitable for maintaining uniformity of temperature across a reflective plate and a method for manufacturing the same, and a backlight unit for an LCD device using the same.

2. Discussion of the Related Art

In general, a liquid crystal display device includes a liquid crystal display module, a driving circuit for driving the liquid crystal display module, and a case for protecting the driving circuit and the liquid crystal display module. The liquid crystal display module has a liquid crystal display panel having a matrix of liquid crystal cells in which liquid crystal is injected into a gap between two bonded glass substrates. Switching devices are positioned in each of the liquid crystal cells for switching signals applied to the liquid crystal cells. The liquid crystal display module also includes a backlight unit for providing light to the back side of the liquid crystal display panel. Optical sheets for scattering and diffusing the light from the backlight unit are positioned between the liquid crystal display panel and the backlight unit.

The liquid crystal display panel, the backlight unit, and the optical sheets of the liquid crystal display module are packaged together to prevent light leakage and to protect these components from an external impact. The glass substrates of the liquid crystal display panel in the liquid crystal display module are susceptible to damage due to an external impact. A top case is used to package the backlight unit and the optical sheets together with the liquid crystal display panel. Further, the top case runs along the edges of the liquid crystal display panel such that the liquid crystal display panel can still be viewed. Accordingly, the top case protects the glass substrates of the liquid crystal display panel in the liquid crystal display module from an external impact.

Figure 1:
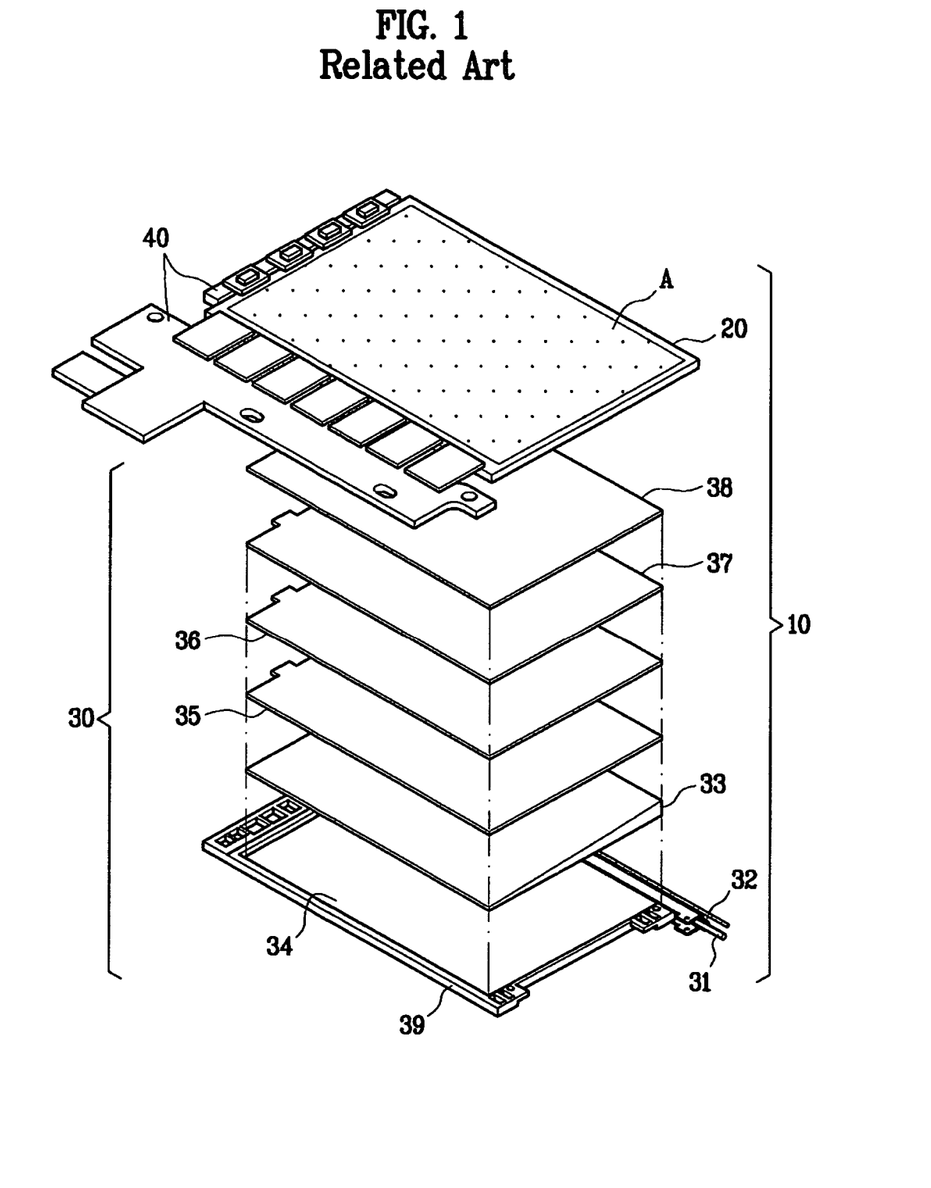
FIG. 1 is an exploded perspective view of the related art liquid crystal display device.

FIG. 1 is an exploded perspective view of the related art liquid crystal display device. As shown in FIG. 1, the liquid crystal display device 10 includes a liquid crystal display panel 20, and a backlight unit 30 for providing light to the liquid crystal display panel 20. The backlight unit 30 includes a fluorescent lamp 31 for emitting light, a lamp housing 32 surrounding the fluorescent lamp 31 in a U shape, a light plate 33 for distributing light from the fluorescent lamp 31, and a reflective plate 34 for reflecting light into the light plate 33. A protective sheet 35, a first prism 36, a second prism 37 and diffusion sheets 38 are positioned in succession on the light plate 33. A bottom cover 39 for receiving and holding both the liquid crystal display panel 20 and the backlight unit 30.

The backlight unit 30 provides light to a display region A of the liquid crystal display panel 20. The display region A of the liquid crystal display panel 20 has a matrix of liquid crystal cells (not shown) in which liquid crystal (not shown) is injected into a gap between two bonded glass substrates (not shown). The liquid crystal display device 10 also includes a driving circuit 40 for driving the liquid crystal display panel 20.

When the fluorescent lamp 31 at one edge of the light plate 33 emits light, the lamp housing 32 focuses and directs the light toward an edge of the light plate 33. Then, the light from the edge of the light plate spreads throughout the entire surface of the light plate 33 and is redirected toward the display region A of the liquid crystal display panel 30 through the protective sheet 35, the first prism 36, the second prism 37 and the diffusion sheets 38. A thin film transistor on the liquid crystal display panel controls transmission of the light through a pixel in response to a signal from the driving circuit of the liquid crystal display device. Together, the pixels display a picture on the display region of the liquid crystal display panel.

Figure 2:
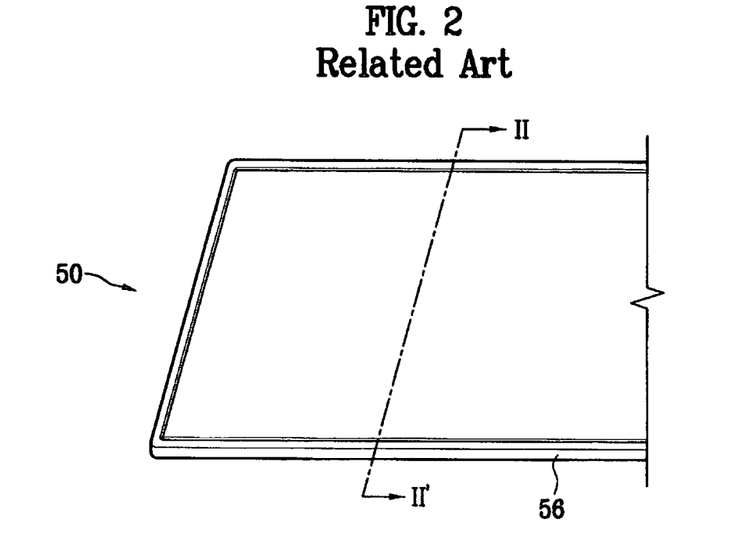
FIG. 2 is a plan view of the related art backlight unit.
Figure 3:
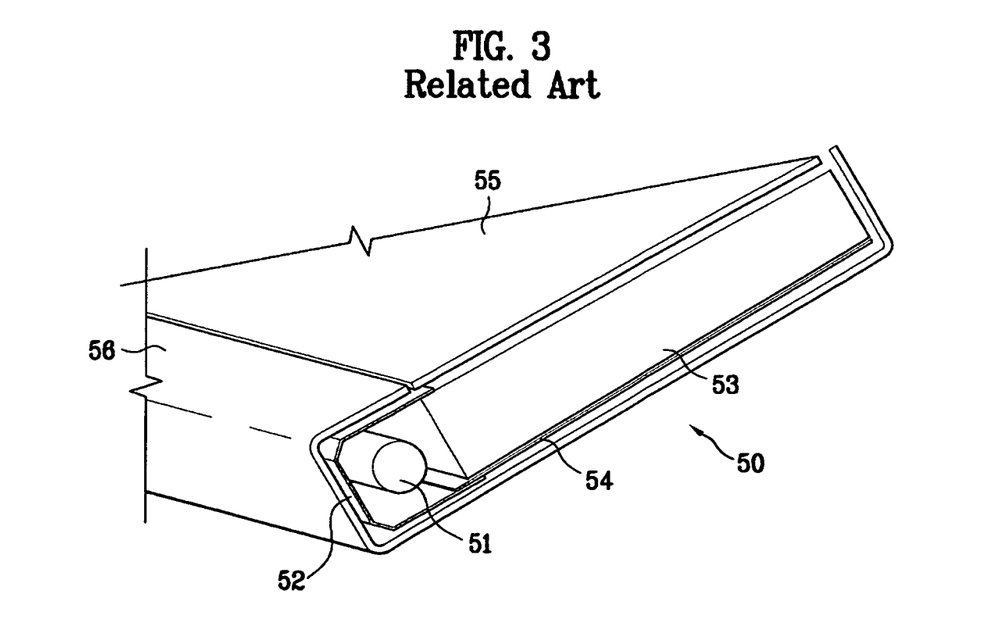
FIG. 3 is a cross-sectional view of the related art backlight unit in FIG. 2 along the line II-II'.

FIG. 2 is a plan view of the related art backlight unit, and FIG. 3 is a cross-sectional view of the related art backlight unit in FIG. 2 along line II-II'. As shown in FIGS. 2 and 3, the related art backlight unit 50 includes a lamp 51 for emitting light, a lamp housing 52 for holding the lamp 51 and reflecting light from the lamp 51 toward one direction, and a light plate 53 for distributing the light from the lamp 51 into a planar light and providing the planar light to a liquid crystal display panel (not shown). The related art backlight unit 50 also includes a reflective plate 54 on a back side of the light plate 53 for reflecting the light toward the liquid crystal display panel, an optical sheet 55 on the light plate 53 for enhancing a luminance of the light, and a cover bottom 56 for supporting an assembly of the lamp housing 52 and the light plate 53. The reflective plate 54 under the light plate 53 re-reflects light directed thereto through a bottom surface of the light plate 53, thereby increasing light utilization efficiency.

The lamp 51 is typically a cold cathode fluorescent lamp, and the light plate 53 has a scattering pattern (not shown) formed at a predetermined portion thereof for scattering light and a reflecting portion (not shown) in which the light is internally reflected. The light plate 53 has a display region (not shown) and a non-display region (not shown). Light entering into the light plate 53 through a light incident surface at an edge of the light plate 53 from the lamp 51 advances toward the display region of the light plate 53 through the non-display region in which the light is internally reflected. The light is scattered by the scattering pattern in the display region.

Figure 4:
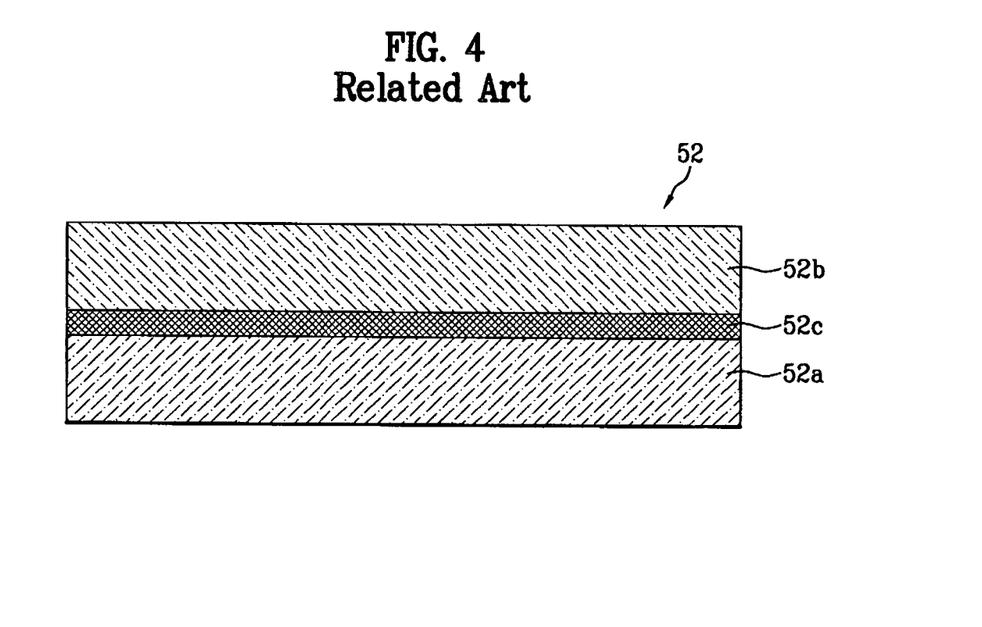
FIG. 4 is a cross-sectional view of the lamp housing in the related art backlight unit.

FIG. 4 is a cross-sectional view of the lamp housing in the related art backlight unit. Referring to FIG. 4, the lamp housing 52 has aluminum (Al) film 52a and a reflective film 52b, such as polypropylene (PP) or Polyethylene Terephthalate (PET), bonded together with an adhesive 52c. The reflective film 52b is placed on an inner side of the lamp housing 52 and the aluminum film 52a is placed on an outer side of the lamp housing 52. More specifically, the reflective film 52b portion is on the inner side of the lamp housing 52 for reflecting the light from the lamp 51 in one direction, and the aluminum film 52a is on the outer side for dissipating heat from the lamp 51 to outside of the liquid crystal display panel. The reflective plate 52 of the related art backlight unit is a reflective film, such as polypropylene (PP) or Polyethylene Terephthalate (PET), coated onto a back side of the light plate 53.

Because the backlight unit has the reflective film on the inside of the lamp housing and on the backside of the light plate, heat from the lamp can not efficiently dissipate to the bottom cover through the lamp housing. In effect, the reflective films act as insulation. Thus, heat builds up within the backlight unit that effects the liquid crystal display panel. Such heat build-up can cause deformation of the components within the liquid crystal display panel. Moreover, deformation of the optical sheet and the large view angle polarization plate of a LCD device causes light leakage at upper and lower corners of the display panel.

SUMMARY OF THE INVENTION

Accordingly, embodiments of the invention are directed to a reflective plate and method for manufacturing the same and backlight unit for a liquid crystal display (LCD) device using the same that substantially obviates one or more of the problems due to limitations and disadvantages of the related art.

An object of embodiments of the invention is to provide a reflective plate which can effectively dissipate heat from the lamp of a backlight to outside of the liquid crystal display panel.

Another object of embodiments of the invention is to provide a method for manufacturing a reflective plate which can effectively dissipate heat from the lamp of a backlight to outside of the liquid crystal display panel.

Another object of embodiments of the invention is to provide a liquid crystal display (LCD) device using a backlight unit with a reflective plate which can effectively dissipate heat from the lamp of a backlight to outside of the liquid crystal display panel.

Additional advantages, objects, and features of embodiments of the invention will be set forth in part in the description which follows and in part will become apparent to those having ordinary skill in the art upon examination of the following or may be learned from practice of the invention. The objectives and other advantages of embodiments of the invention may be realized and attained by the structure particularly pointed out in the written description and claims hereof as well as the appended drawings.

To achieve these objects and other advantages and in accordance with embodiments of the invention, as embodied and broadly described herein, a reflective plate includes a high heat conductivity material having a first heat conductivity and a reflective material having a second heat conductivity on the high heat conductivity material, wherein the first heat conductivity of the high heat conductivity material is greater than the second heat conductivity of the reflective material.

In another aspect, a method for manufacturing a reflective plate includes providing a heat dissipation plate of high heat conductivity material having a first heat conductivity and forming a reflective material having a second heat conductivity on the high heat conductivity material, wherein the first heat conductivity is greater than the second heat conductivity.

In another aspect, a method for manufacturing a reflective plate includes providing a heat dissipation base, placing a heat dissipation plate of high heat conductivity material having a first heat conductivity on the heat dissipation base, and placing a reflective material having a second heat conductivity on the high heat conductivity material, wherein the first heat conductivity is greater than the second heat conductivity.

In another aspect, a backlight unit includes a lamp for emitting light, a light plate for distributing the light from the lamp into a planar light and directing the planar light to a liquid crystal display panel, a lamp housing for reflecting the light from the lamp onto a light incident surface at an edge of the light plate, a reflective plate having a stack of a high heat conductivity material with a first heat conductivity and a reflective material having a second heat conductivity on a back side of the light plate, and a bottom cover for supporting the lamp housing and the light plate, wherein the first heat conductivity is greater than the second heat conductivity.

In another aspect, a backlight unit includes a plurality of lamps for emitting light, a cover bottom for supporting and receiving the plurality of lamps, an optical sheet for covering an upper surface of the bottom cover and diffusing the light from the plurality of lamps, and a reflective plate having a stack of a high heat conductivity material with a first heat conductivity and a reflective material with a second heat conductivity on an inside surface of the bottom cover for reflecting the light from the plurality of lamps toward the optical sheet, wherein the first heat conductivity is greater than the second heat conductivity.

In another aspect, a liquid crystal display device includes a liquid crystal display panel for displaying a picture, a lamp for emitting light, a light plate for distributing the light from the lamp into a planar light and directing the planar light to a liquid crystal display panel, a lamp housing for reflecting the light from the lamp onto a light incident surface at an edge of the light plate, a reflective plate having a stack of high heat conductivity material with a first heat conductivity and a reflective material having a second heat conductivity on a back side of the light plate, and a bottom cover for supporting the lamp housing and the light plate, wherein the first heat conductivity is greater than the second heat conductivity.

In yet another aspect, a liquid crystal display device includes a plurality of lamps for emitting light, a cover bottom for supporting and receiving the plurality of lamps, an optical sheet for covering an upper surface of the bottom cover and diffusing the light from the plurality of lamps, and a reflective plate having a stack of a high heat conductivity material with a first heat conductivity and a reflective material with a second heat conductivity on an inside surface of the bottom cover for reflecting the light from the plurality of lamps toward the optical sheet, wherein the first heat conductivity is greater than the second heat conductivity, and a liquid crystal display panel over the optical sheet for receiving the light through the optical sheet to display a picture.

It is to be understood that both the foregoing general description and the following detailed description of embodiments of the invention are exemplary and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 5A:
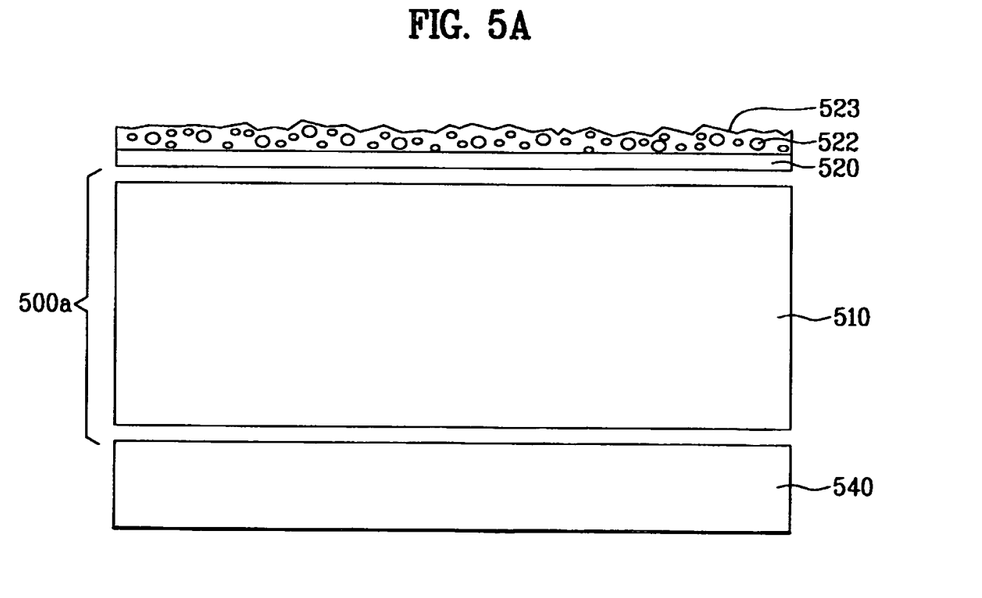
FIGS. 5A to 5C illustrate cross-section views each showing a reflective plate in accordance with embodiments of the invention.
Figure 5B:
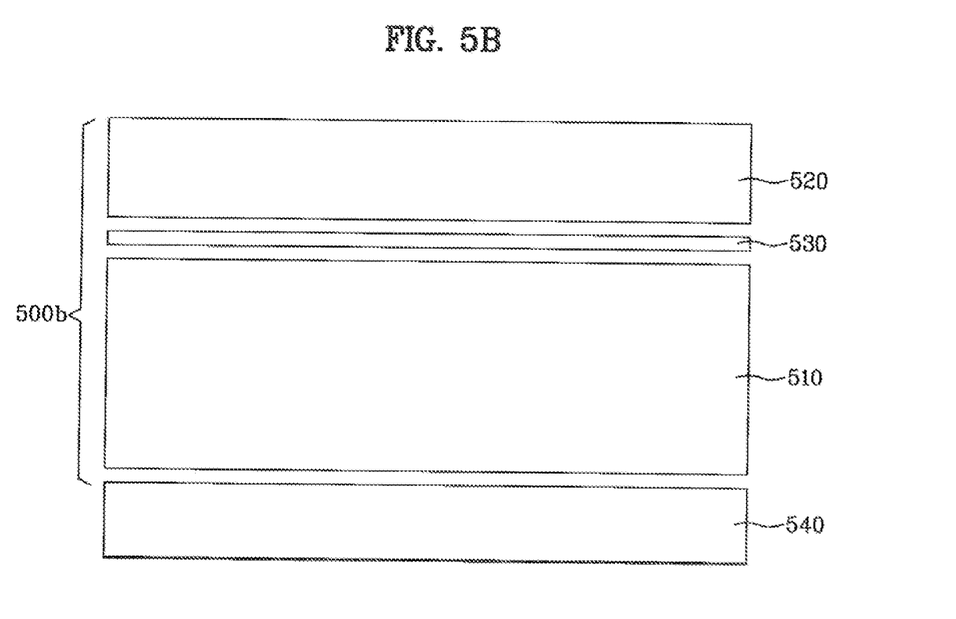
Figure 5C:
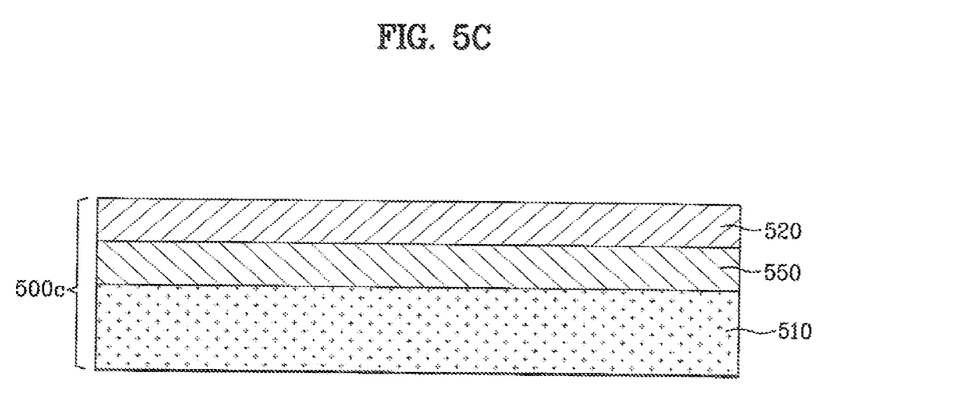

FIGS. 5A to 5C illustrate cross-sectional views each showing a reflective plate in accordance with embodiments of the invention. As shown in FIG. 5A, a reflective plate 500a is on a buffer layer 540. The reflective plate 500a includes a reflective material 520 on a high heat conductivity material. A high heat conductivity material is a material that has a higher heat conductivity than the heat conductivity of the reflective material 520. In addition, a shielding layer (not shown) may be provided between the reflective material 520 and the high heat conductivity material 510 as a buffer between the reflective material 520 and for improving stiffness of the reflective plate.

The high heat conductivity material 510 can be at least one of graphite, aluminum, copper, carbon nano tube (CNT), and AlSiC in a sheet, plate or powder form. The high heat conductivity material 510 can have a thickness of about 0.08 mm ~0.20 mm. The reflective material 520 can be at least one of Ag, $Al_2O_3$, $TiO_2$, Al, PET (Polyethylene Terephthalate), and an optical fiber. The reflective material 520 is coated with a scattering material applied thereon. The reflective material 520 can have a thickness of 150~250 μm if the reflective material is used for a monitor, and have a thickness of 115~225 μm if the reflective material is used for a notebook PC. A plurality of diffusion beads 522 in a diffusion material 523 can be coated on the reflective material 520, such as an AlNd layer, to improve the reflection ratio, as shown in FIG. 5A. The reflective plate 500a is formed by depositing the reflective material 520 on the high heat conductivity material 510 through a plasma vapor deposition (PVD) or sputtering process such that the high heat conductivity material 510 and the reflective material 520 are laminated together.

In the alternative, as shown in FIG. 5B, the reflective material 520 and the high heat conductivity material 510 of a reflective plate 500b can be bonded with an adhesive 530. For example, the adhesive 530 may be a two sided adhesive tape. If a refractive index of the adhesive 530 is small, a large reflection ratio can be maintained even if a thickness of the reflective material 520 is small. Because of the use of the high heat conductivity material 510, such as graphite, the high heat conductivity material 510 can have a thickness less than the reflective material 520. The buffer layer 540 covers bottom and side surfaces of the high heat conductivity material 510 to prevent the high heat conductivity material 510 from leaking to outside of the backlight unit and to guard against foreign matters from infiltrating into the high heat conductivity material 510.

For example, the high heat conductivity material 510 can have a thickness of 60~120 μm, the adhesive 530 can have a thickness of 20~40 μm, and the reflective material 520 can have a thickness of 60~100 μm. In addition, a shielding layer (not shown) may be provided between the reflective material 520 and the high heat conductivity material 510 as a buffer between the reflective material 520 and for improving stiffness. The reflective plate 500b can be fabricated by placing the high heat conductivity material 510, the adhesive 530, and the reflective material in succession on the buffer layer 540.

In another alternative, as shown in FIG. 5C, a reflective plate 500c can be a reflective material 520 with shielding layer 550 stacked on the high heat conductivity material 510. The shielding layer 550 provides stiffness to the reflective material 520. By attaching the shielding layer 550 to the reflective material 520, the reflective material 520 and the high heat conductivity material can be manufactured separately and then brought together for assembly.

Figure 6:
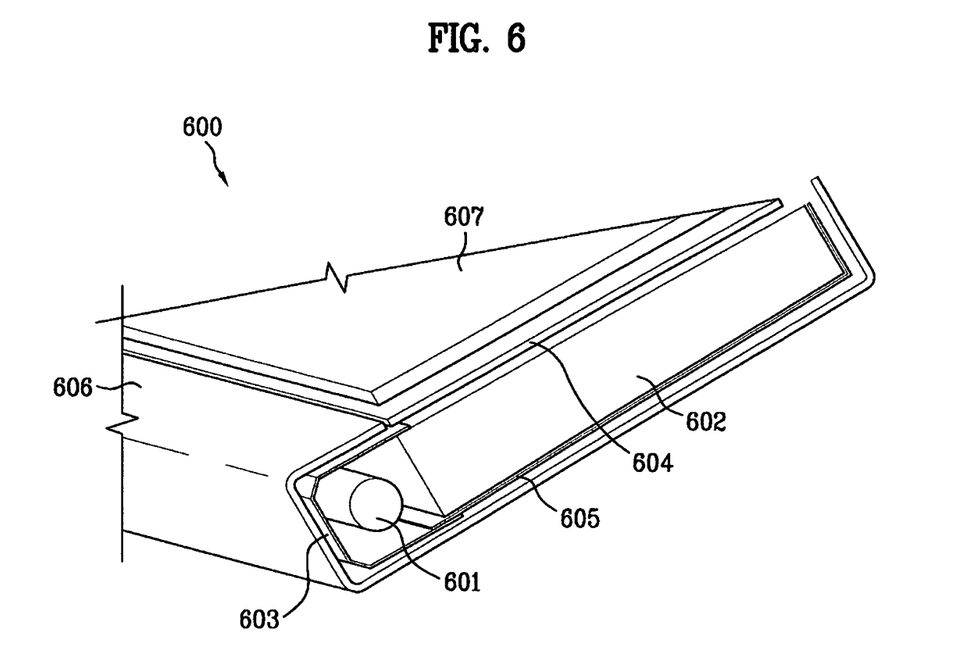
FIG. 6 is a perspective view of a backlight unit in accordance with an embodiment of the invention.

FIG. 6 illustrates a perspective view of a backlight unit in accordance with an embodiment of the invention. Referring to FIG. 6, the backlight unit 600 includes a lamp 601 for emitting light, a light plate 602 for distributing the light from the lamp 601 into a planar light and providing the planar light to a liquid crystal display panel (not shown), a lamp housing 603 having a stack of a high heat conductivity material and a reflective material for positioning the lamp 601 at an edge of the light plate 602 to reflect the light from the lamp 601 onto an edge surface of the light plate 602, a reflective plate 605 having a stack of a high heat conductivity material and a reflective material on a back side of the light plate 602 and at another edge surface of the light plate 602 opposite to the edge surface of the light plate 602 receiving light for reflecting the light toward a liquid crystal display panel 607, an optical sheet 604 on the light plate 602 for enhancing luminance of the light, and a bottom cover 606 for supporting an assembly of the lamp housing 603 and the light plate 602.

The lamp 601 is typically a cold cathode fluorescent lamp, and the light plate 602 has a scattering pattern formed at a predetermined portion thereof for scattering the light reflected on an inside, and is also provided with a display region and a non-display region. The light enters into the light plate 602 through a light incident surface at an edge of the light plate 602 from the lamp 601 and proceeds toward the display region through the non-display region while the light is internally reflected. Light emits through an upper surface of the light plate 602 so as to provide a planar light source as a result of light being dispersed by the scattering pattern of the light plate 602 and being internally reflected within the light plate 602.

The lamp housing 603 and the bottom cover 606 are the heat dissipation bases of the backlight unit 600. The reflective plate 605 having the stack of a high heat conductivity material and a reflective material on the lamp housing 603 and the bottom cover 606 enable the backlight unit in embodiments of the invention to dissipate heat from the lamp 601 through the lamp housing 603 and the bottom cover bottom 606. The reflective plate 605 may extend to an upper surface of the light plate 602 at the edge opposite to the light incident surface of the light plate 602. The lamp 601 may be red, green, and blue light emitting diodes, a plurality of white light emitting diodes, EEFL (External Electrode Fluorescent Lamp) or a CCFL (Cold Cathode Fluorescent Lamp).

The optical sheet 604 can include a diffusion sheet (not shown), at least one prism sheet (not shown), and a protective sheet (not shown) stacked on the light plate 602 in succession. The diffusion sheet optimizes uniformity and orientation of the light from an upper surface of the light plate 602. The prism sheet converges light from the diffusion sheet to an intended direction, such as toward an LCD panel 607, to form a uniform picture. The protective sheet protects the prism sheet and diverges light output so as to increase a viewing angle of the planar light source.

Figure 7:
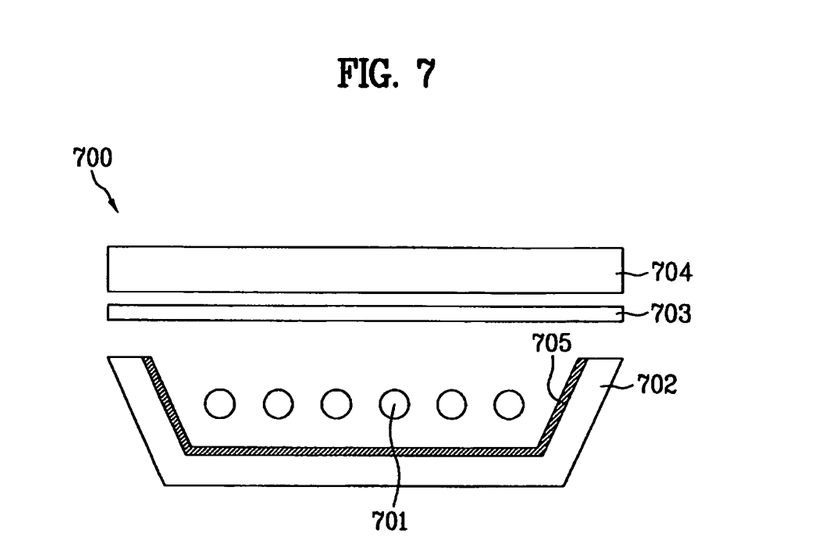
FIG. 7 is a cross-sectional view of a backlight unit in accordance with another embodiment of the invention.

FIG. 7 illustrates a cross-sectional view of a backlight unit in accordance with another embodiment of the invention. As shown in FIG. 7, the backlight unit 700 includes a plurality of lamps 701 for emitting light, a bottom cover 702 for receiving the plurality of lamps 701, an optical sheet 703 over the bottom cover 702 for diffusing and converging the light from the plurality of lamps 701, and a liquid crystal display panel 704 for receiving the light from the optical sheet 703 to display a picture.

The lamps 701 are typically cold cathode fluorescent lamps. The plurality of lamps 701 are lit by a lamp driving voltage from an inverter (not shown) so that the backlight unit emits light to a back side of the optical sheet 703. Moreover, the bottom cover 702 not only supports but also receives the plurality of lamps 701. A reflective plate 705 having a stack of a high heat conductivity material and a reflective material for reflecting the light from the plurality of lamps 701 toward the optical sheet 703 is attached to an inside surface of the bottom cover 702 of the backlight unit 700. The optical sheet 703 includes a diffusion plate (not shown) covering an upper surface of the bottom cover bottom 702 and diffusing the light from the plurality of lamps 701, and a prism sheet (not shown) on the diffusion sheet for converging the light from the diffusion plate.

Figure 8:
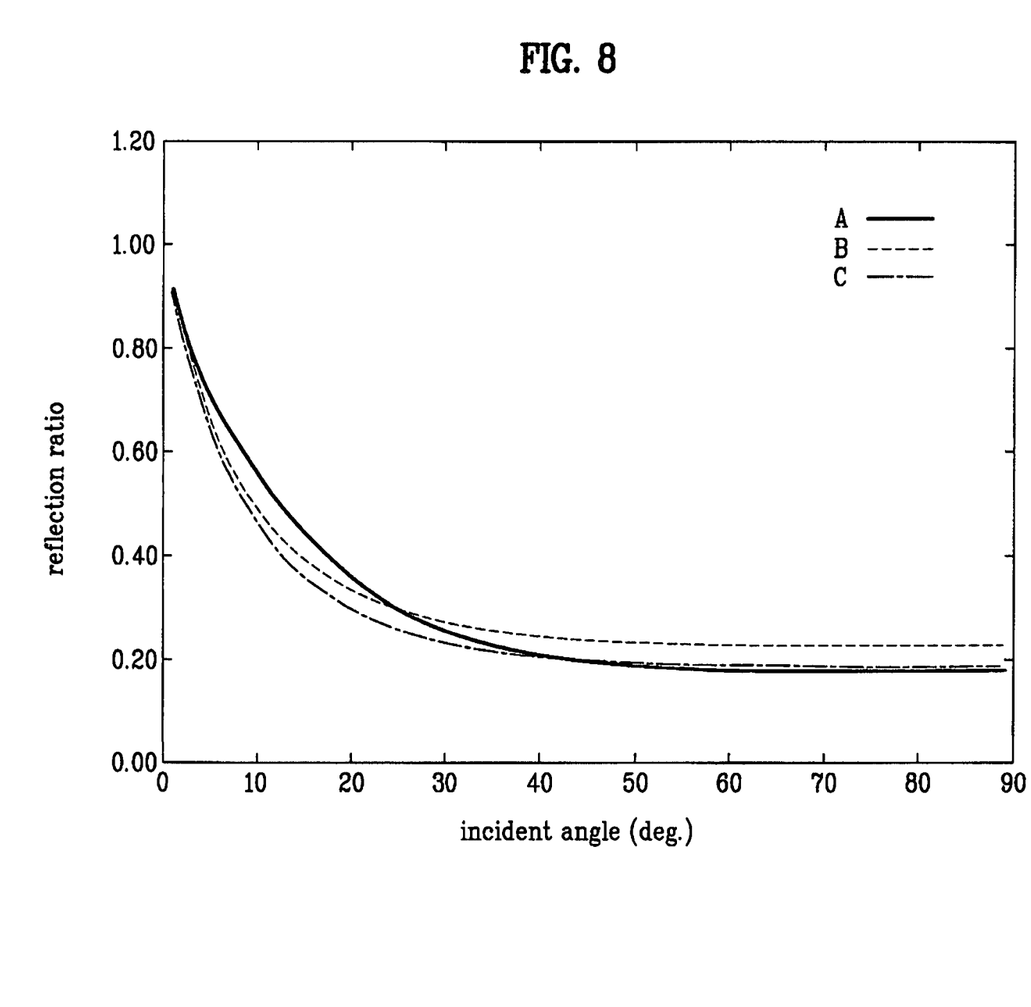
FIG. 8 illustrates a graph showing a comparison of reflection ratios (total reflection characteristics) of the related art reflective plate and a functional reflective plate of embodiments of the invention depending on refractive indices of adhesives in the respective reflective plates.

FIG. 8 illustrates a graph showing a comparison of reflection ratios (total reflection characteristics) of the related art reflective plate and a functional reflective plate of embodiments of the invention depending on refractive indices of adhesives in the respective reflective plates. As shown in FIG. 8, the reflection ratio A of the related art reflective plate has a minimum of 0.178, a maximum of 0.914, and an average of 0.291. However, the reflection ratio B of the functional reflective plate in an embodiment of the invention has a minimum of 0.190, a maximum of 0.908, and an average of 0.276 when the refractive index of the adhesive in the functional reflective plate is 1.41. Moreover, the reflection ratio C of the functional reflective plate in an embodiment of the invention is a minimum of 0.221, a maximum of 0.908, and an average of 0.303 when the refractive index of the adhesive in the functional reflective plate is 1.30.

Although the reflection ratio of the functional reflective plate of an embodiment of the invention is 0.276 on average, which is lower than the related art if a general adhesive of PET or the like with a refractive index 1.41 is used to adhere a reflective plate, the reflection ratio of the reflective plate can be greater than or the same as the related art reflective plate on average if the refractive index of the general adhesive is less than 1.30. Further, overall thickness of the reflective plate can be reduced by using an adhesive having a lower refractive index since the reflection ratio increases without having to increase the thickness of the reflective material.

Table 1 shows refractive indices of various adhesives for different wavelengths in nanometers.

|          | PMMA   | Polystyrene | Polycarb | SAN    | PET    | NAS    | TPFE   |
|----------|--------|-------------|----------|--------|--------|--------|--------|
| 365.0 nm | 1.5136 | 1.6431      | 1.6432   | 1.6165 | —      | —      | —      |
| 404.7 nm | 1.5066 | 1.6253      | 1.6224   | 1.5971 | —      | —      | —      |
| 435.8 nm | 1.5026 | 1.6154      | 1.6115   | 1.5886 | —      | —      | —      |
| 480.0 nm | 1.4983 | 1.6052      | 1.6007   | 1.5800 | 1.6870 | —      | —      |
| 486.1 nm | 1.4978 | 1.6041      | 1.5994   | 1.5790 | —      | 1.5740 | —      |
| 546.1 nm | 1.4938 | 1.5950      | 1.5901   | 1.5713 | 1.6680 | —      | —      |
| 587.6 nm | 1.4918 | 1.5905      | 1.5855   | 1.5674 | 1.6600 | —      | —      |
| 589.3 nm | 1.4917 | 1.5903      | 1.5853   | 1.5673 | —      | 1.5640 | 1.3100 |
| 643.9 nm | 1.4896 | 1.5858      | 1.5807   | 1.5634 | 1.6510 | —      | —      |
| 656.3 nm | 1.4892 | 1.5949      | 1.5799   | 1.5627 | —      | 1.5580 | —      |
| 706.5 nm | 1.4878 | 1.5820      | 1.5768   | 1.5601 | —      | —      | —      |
| 852.1 nm | 1.4850 | 1.5762      | 1.5710   | 1.5551 | —      | —      | —      |
| 1014.0 nm| 1.4831 | 1.5726      | 1.5672   | 1.5519 | —      | —      | —      |

A lamp housing with a reflective plate having high heat conductivity material enables effective dissipation of the heat from the lamp to an outside of the liquid crystal display device through the cover bottom to prevent luminance drop and deformation of optical components caused by temperature rise. By applying an adhesive having lower refractive index between a high heat conductivity material and the reflective material of the reflective plate, total thickness of the reflective plate can be reduced because a large reflection ratio can be maintained with a reflective material having a small thickness.

It will be apparent to those skilled in the art that various modifications and variations can be made in the embodiments of the invention without departing from the spirit or scope of the inventions. Thus, it is intended that the present invention covers the modifications and variations of this invention provided they come within the scope of the appended claims and their equivalents.

What is claimed is:

1. A reflective plate comprising:
   a high heat conductivity material;
   a reflective material having a shielding layer on a bottom of the reflective material for shielding and improving stiffness;
   an adhesive having a small refractive index between the high heat conductivity material and the reflective material, wherein the adhesive bonds the high heat conductivity material and the reflective material;
   wherein the reflective material is at least one of Ag, $Al_2O_3$, $TiO_2$, Al, Polyethylene Terephthalate, and optical fiber,
   wherein the reflective material is coated with a scattering material including a plurality of diffusion beads applied thereon,
   wherein the high heat conductivity material is at least one of graphite and carbon nano tube (CNT) in a form of sheet, plate or powder, and
   wherein the adhesive is formed of TPFE that has refractive index of 1.31 when wavelength is 589.3 nm.

2. The reflective plate of claim 1, wherein the reflective material and the high heat conductivity material are joined by PVD, sputtering, laminating, or coating.

3. The reflective plate of claim 1, further comprising a protective layer for covering an underside and a back surface of the high heat conductivity material.

* * * * *